United States Patent
Dirscherl et al.

(10) Patent No.: US 7,480,687 B2
(45) Date of Patent: Jan. 20, 2009

(54) PSEUDORANDOM NUMBER GENERATOR FOR A STREAM CIPHER

(75) Inventors: Gerd Dirscherl, Munich (DE); Berndt Gammel, Markt Schwaben (DE); Rainer Goettfert, Munich (DE)

(73) Assignee: Infineon Technologies AG, Neubiberg (DE)

( * ) Notice: Subject to any disclaimer, the term of this patent is extended or adjusted under 35 U.S.C. 154(b) by 767 days.

(21) Appl. No.: 10/958,644

(22) Filed: Oct. 5, 2004

(65) Prior Publication Data
US 2005/0120065 A1 Jun. 2, 2005

(30) Foreign Application Priority Data
Oct. 13, 2003 (DE) ................. 103 47 455

(51) Int. Cl.
*G06F 1/02* (2006.01)
*H04L 9/00* (2006.01)
(52) U.S. Cl. ........................ 708/252; 380/46
(58) Field of Classification Search ............... 708/252; 380/46
See application file for complete search history.

(56) References Cited

U.S. PATENT DOCUMENTS

| | | | | |
|---|---|---|---|---|
| 4,852,023 A | * | 7/1989 | Lee et al. | 708/253 |
| 5,323,338 A | | 6/1994 | Hawthorne | |
| 6,009,135 A | * | 12/1999 | Ozluturk | 375/377 |

FOREIGN PATENT DOCUMENTS

| | | | |
|---|---|---|---|
| EP | 0 291 405 A2 | 11/1988 | |
| JP | 2001-281324 A1 | 10/2001 | |

OTHER PUBLICATIONS

R. Mita, et al., "A Novel Pseudo Random Bit Generator for Cryptography Applications," 2002 IEEE, pp. 489-492.

* cited by examiner

*Primary Examiner*—Chuong D Ngo
(74) *Attorney, Agent, or Firm*—Dickstein Shapiro LLP

(57) ABSTRACT

A pseudorandom number generator includes a unit for providing a number of 2n sequences of numbers, n being greater than or equal to 2. The sequences of numbers are combined by a unit such that at first all the sequences of numbers are combined with one another in an intermediate processing stage to obtain an intermediate processing sequence, and that subsequently a subgroup of k sequences of numbers is combined with the intermediate processing sequence in a final processing stage to obtain the output sequence.

25 Claims, 8 Drawing Sheets

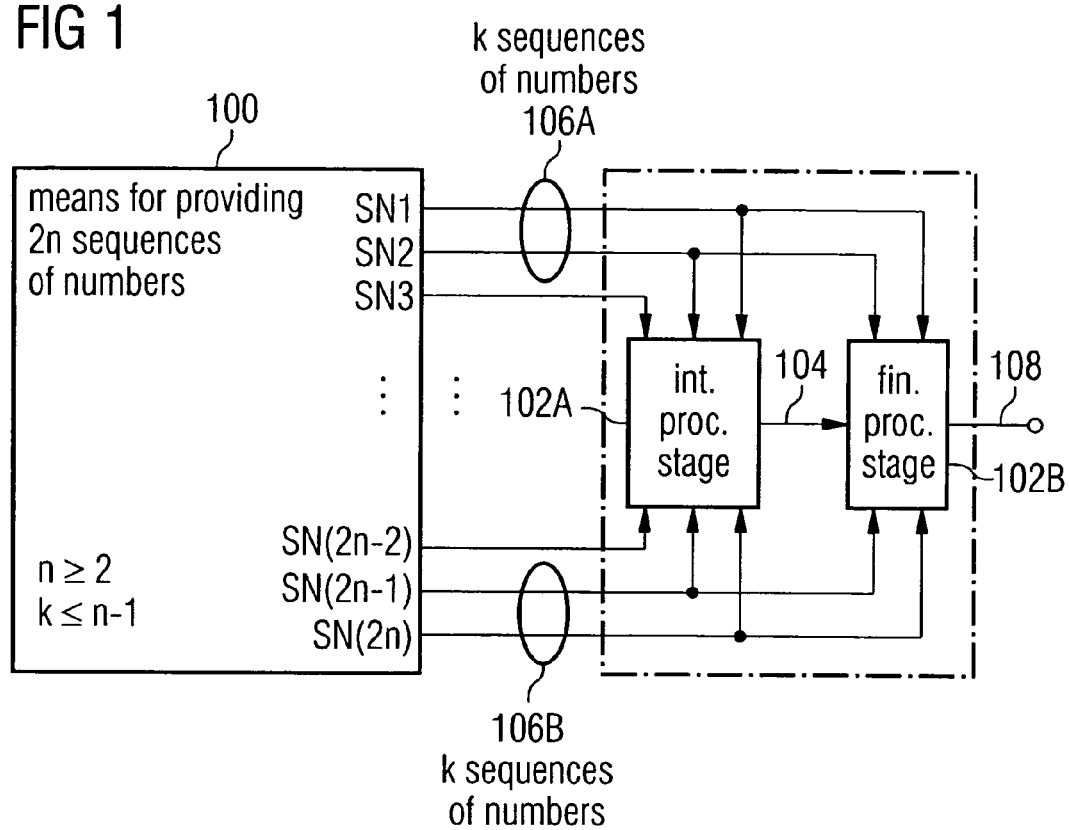
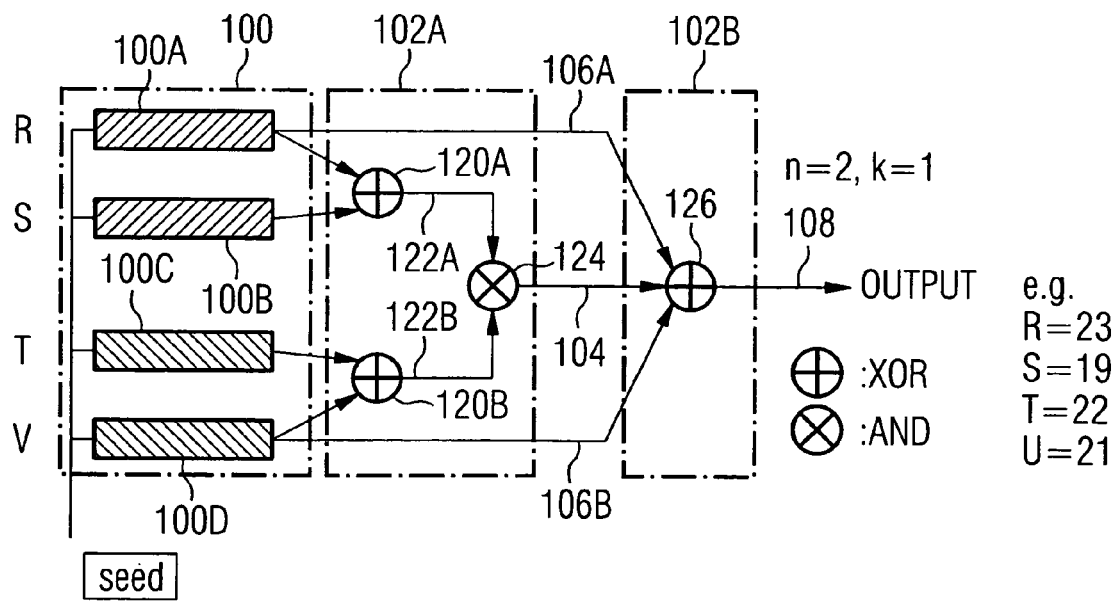

principle of sequentially ciphering

| plain text | $a_0$ $a_1$ $a_2$ $a_3$ $a_4$ $a_5$ $a_6$ $a_7$ $a_8$ ··· | adding, segment per segment, modulo 2 |
|---|---|---|
| key | $z_0$ $z_1$ $z_2$ $z_3$ $z_4$ $z_5$ $z_6$ $z_7$ $z_8$ ··· | |
| secret text | $c_0$ $c_1$ $c_2$ $c_3$ $c_4$ $c_5$ $c_6$ $c_7$ $c_8$ ··· | |

$c_i = a_i \oplus z_i$    for every $i = 0, 1, 2, ...$ ciphering:   $c_i = a_i \oplus z_i$
deciphering:   $a_i = c_i \oplus z_i$ if contents of memory element 4=0,
    then feedback polynomial $X^8+X^7+1$
if contents of memory element 4=1,
    then feedback polynomial $X^8+X^6+1$ signal flow in FFM
61 ated. Further, the shift register is described by the occupancy of its delay elements.

PSEUDORANDOM NUMBER GENERATOR FOR A STREAM CIPHER

CROSS-REFERENCE TO RELATED APPLICATION

This application claims priority from German Patent Application No. 103 47 455.2, which was filed on Oct. 13, 2003, and is incorporated herein by reference in its entirety.

BACKGROUND OF THE INVENTION

1. Field of the Invention

The present invention relates to pseudorandom number generators and, in particular, to pseudorandom number generators which are suitable for so-called stream ciphers, that is sequential encrypting devices. In particular, the inventive pseudorandom number generators are suitable as key sequence generators for such ciphering devices.

2. Description of the Related Art

Such a well-known random number generator is illustrated in FIG. 12. The pseudorandom number generator of FIG. 12 which is also referred to as a linear feedback shift register, includes a plurality of memory cells 51, 52, 53, 54, which, in FIG. 12, are numbered 0 to n. The memory cells can be initialized to an initial value via initializing means 55. The memory cells 51 to 54 together form feedforward means, while the linear shift register formed by the memory cells 51 to 54, is fed back by feedback means coupled between an output 56 of the circuit and the memory cell n. In particular, the feedback means includes one or several combining means 57, 58 which are fed by respective feedback branches 59a, 59b, 59c as is exemplarily illustrated in FIG. 12. The initial value of the last combining means 58 is fed into the memory cell n which, in FIG. 12, is designated by 54.

The linear feedback shift register shown in FIG. 12 is driven by a clock so that the occupancy of the memory cells is shifted by one step, referring to FIG. 12, to the left in each clock cycle, so that in each clock cycle the state stored in the memory means 51 is output as a number, while at the same time the value is fed into the first memory cell n of the sequence of memory cells at the output of the last combining means 58. The linear feedback shift register illustrated in FIG. 12 thus provides a sequence of numbers responsive to a sequence of clock cycles. The sequence of numbers obtained at the output 56 depends on the initial state made by the initializing means 55 before operating the shift register. The initial value input by the initializing means 55 is also referred to as a seed, which is why such arrangements illustrated in FIG. 12 are also referred to as seed generators.

The sequence of numbers obtained at the output 56 is referred to as a pseudorandom sequence of numbers since the numbers seem to follow one another in a seemingly random way, but are periodical in all even though the period duration is great. In addition, the sequence of numbers can be repeated unambiguously and thus has a pseudorandom character when the initializing value fed to the memory cells by the initializing means 55 is known. Such shift registers are, for example, employed as key stream generators to provide a stream of encoding/decoding keys depending on a special initializing value (seed).

Such shift registers illustrated in FIG. 12 have the disadvantage of a small linear complexity. Thus, 2 n bits of the output sequence are sufficient in an n-bit LFSR (LFSR=linear feedback shift register) to calculate the entire sequence. The advantage of such well-known LFSRs illustrated in FIG. 12, however, is that they incur very low hardware costs.

In addition, there are irregularly clocked LFSRs. They incur somewhat increased hardware costs with a mostly smaller period. The linear complexity, however, may be increased considerably. A disadvantage of such irregularly clocked devices, however, is the fact that the output sequence can, in principle, be established by means of measuring the current in an SPA (SPA=simple power analysis) due to the irregular clocking. By using the shift register devices as parts of key generators which produce data to be kept secret inherently, that is key data, it is of crucial importance for them to be safe against any kind of cryptographic attacks.

On the other hand, there is the requirement in such devices, in particular when they are to be accommodated on chip cards, that the hardware costs be low. Put differently, the chip area such devices occupy must be as small as possible. The reason for this is that in semiconductor manufacturing, the chip area of an entire device in the end determines the price and thus the profit margin of the chip manufacturer. In addition, a specification, especially in chip cards, usually is such that a customer sets the maximal area of a processor chip, in square millimeters, on which different functionalities must be accommodated. It is thus the task of the circuit manufacturer to distribute this valuable area for the individual components. Regarding cryptographic algorithms which are becoming more complex all the time, efforts of the chip manufacturer are directed to the chip having the largest amount of memory possible to be able to calculate even algorithms requiring lots of working memory in an acceptable time. The chip area for key generators and other such components thus must be kept as small as possible in order to be able to accommodate a greater amount of memory on the chip area given.

The general requirement for key generators or devices for generating a pseudorandom sequence of numbers thus is to be safe on the one hand and to require as little space as possible on the other hand, that is to incur the lowest possible hardware costs.

In principle, linear shift registers have different applications in coding theory, cryptography and other areas in electro-technology. The output sequences of linear shift registers have useful structural features which can be divided into algebraic features and distribution features.

One knows that the output sequence of an n-step linear shift register, as has been explained, is periodic. The length of the period can be rather large and is often exponential with regard to n, that is the number of memory cells. In particular, the length of the period is $2^n-1$ when the shift register is based on a primitive feedback polynomial.

The linear complexity of such a sequence, however, at most equals n. The linear complexity of a periodic sequence, as per definition, equals the number of cells of the smallest possible shift register the sequence considered can produce.

Due to this fact, it can be shown that, as has been explained, 2 n successive expressions of the sequence are sufficient to predict all the remaining expressions of the sequence. Additionally, there is an efficient algorithm, the so-called Berlekamp Massey algorithm, for calculating the parameters required to obtain the entire sequence. For this reason, sequences of linear shift registers, despite their potentially great periods and their statistically good distribution features, are not directly suitable as key sequences in so-called stream ciphers. In addition, there are other applications in which the comparatively small linear complexity of a sequence produced by a linear shift register is to be seen as a disadvantage.

Conventionally, linear shift registers are described by their characteristic polynomial. The degree of the characteristic polynomial equals the number of delay elements, which are usually embodied as flip-flops, of the shift register considered. The exponents of the terms of f(x), except for the leading term, correspond to the delay elements of the shift register contributing to the feedback. The linear shift register illustrated in FIG. 12 would thus have a characteristic polynomial of the following kind:

$$f(x)=x^{n+1}+x^n+\ldots+x+1.$$

If such linear shift registers, as are exemplarily illustrated in FIG. 12, are loaded with an initializing state by the initializing means 55, wherein this state is also referred to as the initial state vector, they will typically output a periodic sequence which, depending on the implementation, has a certain pre-period and a subsequent period. Linear shift registers will always be periodic. It is strived for in technological applications for the output sequence to have both a great period length and a high linear complexity.

In principle, pseudorandom number generators, as have, for example, been illustrated referring to FIG. 12, are required for different purposes, that is for simulation purposes, for performing random samples in statistic applications, for testing computer programs, for sequentially ciphering to generate a key sequence, for probabilistic algorithms, in numerical mathematics, in particular for a numerical integration, for generating keys in cryptology or for Monte Carlo methods. In particular, pseudorandom number generators are commercially employed for safety ICs, within typically integrated random number generators, within crypto-modules or for pay TV applications or even in chip cards for cell phones, etc.

Basically, random numbers can be generated on the basis of a physically random process or else by certain mathematical manipulations. Only in the latter case, we speak of pseudorandom numbers, while in the first case, we speak of true random numbers. In a pseudorandom number generator, numbers are generated from certain initial values, the so-called seed which is effected by the initializing means 55 of FIG. 12, typically at a very high speed, wherein the numbers must pass a number of tests which true random numbers would also pass. The seed, however, is produced by a true physical random process. As has been illustrated referring to FIG. 12, linear feedback shift registers (LFSR) are used to provide pseudorandom number generators. Shift registers with a linear feedback are of advantage in that they are mathematical theories stating that certain features of the pseudorandom numbers produced can be predicted theoretically. The most important features are the period length and the linear complexity of the output sequence. Thus, there are theories for linear shift registers which make it possible to either exactly predict the output sequence or at least to make statements on the minimum length of the period and the maximum size of the linear complexity. Put differently, lower thresholds for the period length and the linear complexity can be indicated and proved by mathematical processes.

The disadvantage connected to using shift registers with linear feedback as basic building blocks in pseudorandom number generators is that the output sequences have a linear complexity which is relatively small compared to the period length. The reason for this is that the output sequences of an individual shift register with linear feedback already have such a disproportion of period length to linear complexity. When a shift register with linear feedback, for example, includes N memory cells, such as, for example, flip-flops, the period length of the output sequence can at most take the value $2^N-1$. If the feedback polynomial is selected well, this will really be the case. The linear complexity of the output sequence, however, at most equals N.

In order to increase the period length and at the same time the linear complexity, it would thus be necessary using a shift register with linear feedback to keep on increasing the number of memory cells, which, on the one hand, entails problems regarding the space and which, on the other hand, entails electrical problems since all the memory cells in a shift register must be addressed by a block, wherein synchronization problems are becoming ever more pronounced when the number of memory cells increases.

Additionally, an ever greater number of memory cells within a single shift register has the result that the pseudorandom number generator can be localized ever more easily by an attacker and thus becomes the target of a crypto attack ever more easily. This is of special disadvantage when the pseudorandom number generator contains secret information or operates on the basis of secret information, which will typically be the case when the pseudorandom number generator is used in a cryptographic field.

Such pseudorandom number generators described herein before are usually used in stream ciphers, which are, for example, employed in safety ICs, random number generators, crypto modules, pay TV applications, cell phones or chip cards.

In principle, the requirements in pseudorandom number generators differ depending on the field in which the pseudorandom number generators are employed. If a pseudorandom number generator is, for example, required to control a simulation based on random numbers, such as, for example, a Monte Carlo simulation, certain randomness will be required from the pseudorandom numbers in order for the simulation to operate optimally. Safety aspects, however, do not play a role. If, however, a pseudorandom number generator is to be employed in a stream cipher, it will have to deal with processing secret information. Typically, the initialization of the random number generator, that is the so-called seed, will be the secret or the session key which must be known to both a sender of encrypted data as well as to a receiver of the encrypted data to perform encryption on the sender side and to perform decryption on the receiver side.

In contrast to plain pseudorandom number generators, additional requirements are placed on key sequence generators in a stream cipher. It is thus not sufficient for optimal applications for the key sequence to have good statistical features (which, for a Monte Carlo simulation, will be sufficient), but the output sequence or key sequence the pseudorandom number generator provides must not make possible drawing conclusions to the current state of the key sequence generator itself and, in particular, to the initialization, which is the actual secret, which is the basis for the key sequence. Put differently, so-called correlation immunity is required for a pseudorandom number generator which is to be employed in a stream cipher.

Complete correlation immunity means that the output sequence (=key sequence) does not contain any information on the one or several individual input sequences (which here are the preferably used individual shift register sequences). The output sequence must be uncorrelated to each individual shift register sequence (input sequence).

Additionally, high-quality stream ciphers have the characteristic of having the so-called "strict avalanche criterion". The following is meant by this criterion. A bit of the output sequence (key sequence) always has to change with the probability of 0.5 when exactly one input bit is complemented, i.e. when a 1 becomes a 0 or when a 0 becomes a 1, while the other input bits, however, remained unchanged. From that point of view it is not important which input bit will be complemented.

Both the correlation immunity and the strict avalanche criterion are thus quality requirements which, in the end, determine whether a pseudorandom number generator will not only be used for statistical simulations but also for cryptographic purposes, since ever higher safety requirements of the pseudorandom number generators can be fulfilled with an ever improving correlation immunity and/or avalanche criterion.

SUMMARY OF THE INVENTION

It is an object of the present invention to provide a pseudorandom number generator or a ciphering/deciphering device having such a pseudorandom number generator, which, on the one hand, are safe and, on the other hand, efficient.

In accordance with a first aspect, the present invention provides a pseudorandom number generator having: means for providing a number of 2n sequences of numbers, n being greater than or equal to 2; means for combining the sequences of numbers to obtain an output sequence, wherein the means for combining has: an intermediate processing stage for combining the sequences of numbers to produce an intermediate processing sequence; and a final processing stage for combining a subgroup of k of the sequences of numbers with the intermediate processing sequence to obtain the output sequence, k being greater than or equal to 1 and smaller than n.

In accordance with a second aspect, the present invention provides a method of providing pseudorandom numbers, having the following steps: providing a number of 2n sequences of numbers, n being greater than or equal to 2; and combining the sequences of numbers to obtain an output sequence, wherein the sequences of numbers will at first be combined in an intermediate processing step to obtain an intermediate processing sequence, and wherein the intermediate processing sequence will then be combined with a subgroup of k of the sequences of numbers in a final processing step to obtain the output sequence, k being greater than or equal to 1 and smaller than n.

In accordance with a third aspect, the present invention provides a device for ciphering or deciphering, having: means for providing a plain text sequence to be ciphered or a secret text sequence to be deciphered; a pseudorandom number generator having: means for providing a number of 2n sequences of numbers, n being greater than or equal to 2; means for combining the sequences of numbers to obtain an output sequence, wherein the means for combining has: an intermediate processing stage for combining the sequences of numbers to produce an intermediate processing sequence; and a final processing stage for combining a subgroup of k of the sequences of numbers with the intermediate processing sequence to obtain the output sequence, k being greater than or equal to 1 and smaller than for providing an output sequence; and means for linking the plain text sequence to the output sequence or the secret text sequence to the output sequence to obtain a ciphered sequence or a deciphered sequence.

In accordance with a fourth aspect, the present invention provides a method of ciphering or deciphering, having the following steps: providing a plain text sequence to be ciphered or a secret text sequence to be deciphered; providing a pseudorandom output sequence according to a method of providing pseudorandom numbers, having the following steps: providing a number of 2n sequences of numbers, n being greater than or equal to 2; and combining the sequences of numbers to obtain an output sequence, wherein the sequences of numbers will at first be combined in an intermediate processing step to obtain an intermediate processing sequence, and wherein the intermediate processing sequence will then be combined with a subgroup of k of the sequences of numbers in a final processing step to obtain the output sequence, k being greater than or equal to 1 and smaller than n; and linking the plain text sequence to the output sequence or the secret text sequence to the output sequence to obtain a ciphered sequence or a deciphered sequence.

In accordance with a fifth aspect, the present invention provides a computer program having a program code for performing a method of providing pseudorandom numbers, having the following steps: providing a number of 2n sequences of numbers, n being greater than or equal to 2; and combining the sequences of numbers to obtain an output sequence, wherein the sequences of numbers will at first be combined in an intermediate processing step to obtain an intermediate processing sequence, and wherein the intermediate processing sequence will then be combined with a subgroup of k of the sequences of numbers in a final processing step to obtain the output sequence, k being greater than or equal to 1 and smaller than n, or a method of ciphering or deciphering, having the following steps: providing a plain text sequence to be ciphered or a secret text sequence to be deciphered; providing a pseudorandom output sequence according to the above-mentioned method of providing pseudorandom numbers; and linking the plain text sequence to the output sequence or the secret text sequence to the output sequence to obtain a ciphered sequence or a deciphered sequence, when the program runs on a computer.

The present invention is based on the finding that a high correlation immunity can be obtained by combining 2n sequences of numbers, that is several sequences of numbers, in a two-stage combining process in which, at first, an intermediate processing stage for combining the sequences of numbers is provided to obtain an intermediate processing sequence, and in which a final processing stage is also provided to combine the intermediate processing sequence with a subgroup of k sequences of numbers to obtain the output sequence, wherein the value of k is greater than or equal to 1 and smaller than or equal to n.

Put differently, it has been found that a high correlation immunity can be obtained by feeding a number k of sequences of numbers to both the intermediate processing stage and the final processing stage, i.e. is used multiply in that it is combined with an overall combining result of all the sequences of numbers. Additionally, it has been found that this two-stage combining concept in which all the partial sequences are fed to the intermediate processing stage and only some partial sequences are fed to the final processing stage, are favorable at the same time regarding the strict avalanche criterion.

In a preferred embodiment, the intermediate processing stage is symmetrical in that it combines the first n sequences of numbers to obtain a first sub-combining result, in that it also combines the second n sequences of numbers to obtain a second sub-processing result, and in that it additionally multiplies the two sub-processing results to obtain the intermediate processing sequence which in turn is fed to the final processing stage, together with k partial sequences of the above n sequences of numbers and, at the same time, with a number of k partial sequences of the lower n partial sequences, wherein, as has been explained, k is greater than or equal to 1 and smaller than or equal to n−1. This symmetry ensures a highly advantageous correlation immunity to be obtained on the one hand and, at the same time, the criterion of the strict avalanche criterion to be fulfilled to an increasingly better extent. The most favorable results are particularly obtained by the fact that the individual sequences of numbers are derived from shift registers having non-linear feedback, which has the direct consequence that the periodicity and the linear complexity become maximal, too.

Dividing the combination of the sequences of numbers of the elemental shift registers into a two-stage combining concept wherein all the elemental sequences are combined in the first intermediate processing stage and a combination result of all the sequences is combined in a second combining stage with only a part of the original sequences, is additionally of advantage in that good predictions about the behavior and the features of the final output sequence can be made, wherein this even applies in the case in which the elemental shift registers are shift registers having a non-linear feedback feature.

It is further preferred for high linear complexities, high period lengths and a flexible usage of hardware resources already present for the pseudorandom number generator to be assembled of a plurality of elemental shift registers having non-linear feedback features and for signals to be combined with one another on the outputs of the elemental shift registers to obtain a combined signal which is, for example, a binary digit of a pseudorandom number.

It is to be pointed out here—in a binary case—a binary digit at the output, of course, already is a random number. Usually, a pseudorandom number with, for example, 8, 16, . . . bits is, however, required. In this case, 8, 16, . . . successive bits at the output of the pseudorandom number generator would, for example, be selected. The bits can be successive or not even though the "withdrawal" of successive bits at the output is preferred.

Depending on the combining rule used which is implemented by combining means, a flexible increase in the linear complexity can be obtained. When a non-linear combining rule is used as combining means, such as, for example, a multiplication, that is an AND gate in the binary case, the linear complexity of a pseudorandom number sequence produced by the pseudorandom number generator, under suitable preconditions, equals the product of the linear complexities of the pseudorandom number sequences generated by the individual elemental shift register having non-linear feedback features. When, however, a linear combination is used, such as, for example, in addition (modulo 2), that is an XOR operation in the binary case, the linear complexity of the output sequence of the pseudorandom number generator equals the sum of the linear complexities of the pseudorandom number sequences generated by the elemental shift registers having a non-linear feedback feature. The usage of elemental shift registers having non-linear feedback features instead of linear feedback features makes it possible for the relations illustrated above regarding linear complexity to apply. In addition, the period length of the pseudorandom number generator sequence will always equal the product of the elemental shift register period lengths themselves.

The pseudorandom number generator concept is of particular advantage in that any number of elemental shift registers having non-linear feedback features can be used and that the outputs thereof can be combined by combining means, wherein the combining means can be formed to be very simple, namely, for example, by only performing an AND operation and/or an XOR operation, that is an addition modulo 2.

By using any number of elemental shift registers in the pseudorandom number generator, there is a high flexibility in producing a special linear complexity or period length for every special application. An individual elemental shift register having non-linear feedback thus need not be intervened in when a pseudorandom number generator for a different application is required. Instead, the preferred concept makes it possible for every different application to provide a different number of elemental shift registers having non-linear feedback and to couple them by combining means. The developer, however, is provided with a high degree of freedom to generate, for each application, a precisely dimensioned product which, on the one hand, is not over-dimensioned (and is thus cost effective) and which, on the other hand, is not under-dimensioned and thus comprises the period length and the linear complexity for a special application required.

In addition, the preferred concept is advantageous with regard to safety and flexibility when designing the circuit since various elemental shift registers can be arranged as special units at positions within an integrated circuit desired by the circuit developer. If, however, the number of memory cells were increased when using a single shift register for increasing the linear complexity, such a shift register arrangement having a large number of memory cells could be recognized ever more clearly compared to different considerably smaller elemental shift registers which, in principle, can be arranged at will on an integrated circuit and thus can hardly be localized by an attacker or not localized at all. In the pseudorandom number generator, the elemental shift registers only have to be connected to combining means which usually also includes one or several gates via a single elemental shift register output line, wherein the combining means can be hidden on an integrated circuit easily and without great efforts.

In summary, the pseudorandom number generator is of advantage in that it can be formed efficiently and scalable for the corresponding requirements on the one hand, and that, on the other hand, it entails the possibility to be arranged on an integrated circuit in a distributed way such that it cannot be localized easily for safety-critical applications.

In preferred embodiments of the present invention, the elemental shift registers used are binary shift registers having a non-linear feedback function, which produce maximally periodic sequences whenever not all the cells of the shift register contain the bit 0. Such a maximally periodic shift register having N memory cells produces output sequences of the period length $2^N-1$.

In addition, it is preferred for the numbers of memory cells of the elemental shift registers having non-linear feedback features used in a pseudorandom number generator, in pairs, not to have a common divisor. This means that the elemental shift registers which each include a certain number of memory cells, include numbers of memory cells, the greatest common divisor of which equals 1.

In addition, it is preferred for the elemental shift registers used to comprise the additional feature to produce sequences of maximal linear complexity whenever not all the cells of the shift register contain a 0. Such a shift register having N memory cells produces output sequences having a linear complexity of $2^N-2$. If this feature applies to all the shift registers used, the linear complexity of the output sequence of the pseudorandom number generator has a corresponding maximal value for the linear complexity.

Additionally, it is preferred for the output sequences of some shift registers to be multiplied by one another segment per segment (multiplication modulo 2). The product sequences formed in this way are fed to a total adder.

Additionally, it is preferred for the output sequence of at least one shift register to be directly fed to the total adder.

Finally, it is preferred the output sequence of the total adder which is part of the combining means to represent the output sequence of the entire pseudorandom number generator. In this context, an XOR operation of several input sequences, that is term by term, that is in the binary case bit by bit, is meant by total adder.

It is particularly preferred to use simple combinations of existing non-linear feedback shift registers since theoretical statements about the period length and the linear complexity of the output sequences can exactly be proved mathematically via these simple combinations. This allows the controlled usage of the inventive shift register having a non-linear feedback feature in pseudorandom number generators.

In addition, it is preferred for the individual elemental shift registers, as has been explained, to be maximally periodic non-linear feedback feature shift registers (MP-NLFSRs). A maximally periodic non-linear feedback feature shift register is an NLFSR having the feature of being able to generate sequences of maximal period length. It is assumed that the shift register has N memory cells. The maximal period length will then be $2^N-1$. When the memory cells of an MP-NLFSR are occupied by any initial state (the only exception is that not all the cells can contain the bit 0), this MP-NLFSR will always generate a sequence of maximal period length.

Depending on the implementation MP-NLFSRs can be produced in an experimental manner by computer searching. It has been found that MP-NLFSRs constructed in this way almost always have a very high linear complexity. This means that the output sequence produced by the MP-NLFSR thus not only has a maximal period length of $2^N-1$, but generally also has a similarly high linear complexity. In particular, the maximal value possible for the linear complexity is $2^N-2$, wherein this value is sought for the present invention. This observation results from computer experiments on the one side and is also conform with the mathematically proven rule by Meidl and Niederreiter which is illustrated in IEEE Transactions on Informations Theory 48, no. 11, pp. 2817-2825, November 2002.

As has been explained, it is preferred for the numbers of memory cells of the MP-NLFSRs used, in pairs, not to have common divisors among one another. Exact values for the period length and the linear complexity of the output sequence can then be proved mathematically for certain combinations of the MP-NLFSRs, by a formula containing the quantities R, S, T, . . . , wherein R is the number of memory cells of the first maximally periodic non-linear feedback shift register, S is the number of memory cells of the second maximally periodic non-linear feedback shift register, T is the number of the third elemental shift register, etc.

In addition, maximally periodic non-linear feedback shift registers can be used, the output sequences of which do not have the maximal linear complexity but (somehow) smaller values, such as, for example, L1, L2, and L3. When such elemental shift registers are combined, preferably using a simple combination rule which, for example, only includes an AND or XOR etc. operation, that is a simple logic operation, a formula for the period length and for the linear complexity can also be proved exactly mathematically for the output sequence of the pseudorandom number generator device formed in this way. Such a formula for the linear complexity of the output sequence, however, instead of the quantities R, S, T, . . . , now contains the quantities L1, L2, L3, . . . .

BRIEF DESCRIPTION OF THE DRAWINGS

Preferred embodiments of the present invention will be detailed subsequently referring to the appended drawings, in which:

FIG. 1 shows a block diagram of an inventive pseudorandom number generator according to the present invention;

FIG. 2 shows a block diagram of a pseudorandom number generator according to a preferred embodiment of the present invention;

DESCRIPTION OF THE PREFERRED EMBODIMENTS

Figure 3:
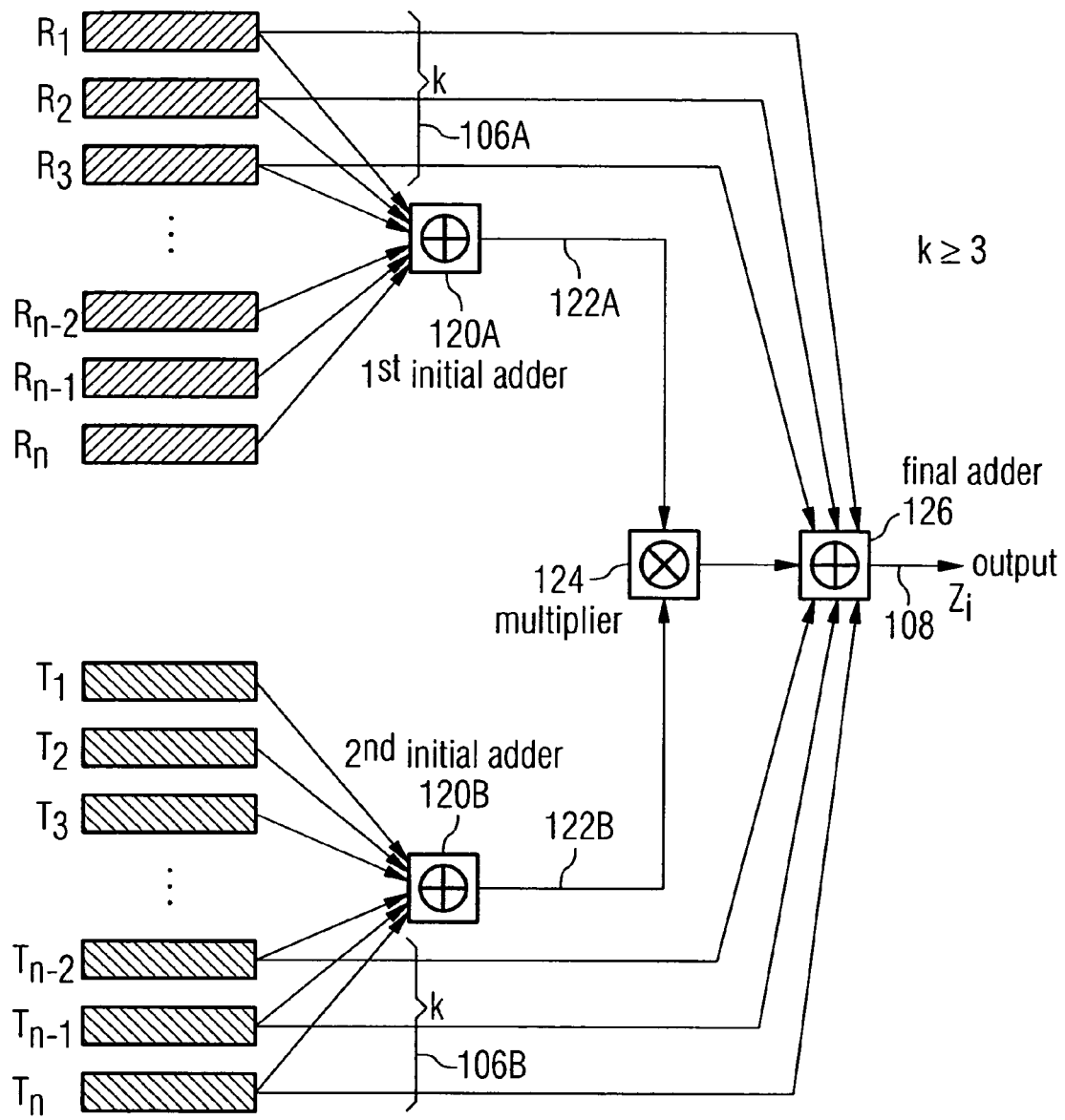
FIG. 3 shows a generalized block diagram of a pseudorandom number generator according to an embodiment of the present invention.

FIG. 1 shows an inventive pseudorandom number generator having means 100 for providing a number of 2n sequences of numbers, wherein n is greater than or equal to 2. The means 100 is formed to provide the sequences of numbers SN1, SN2, SN3, . . . SN(2n−2), SN(2n−1) and SN(2n). Downstream of the means for providing there is combining means 102 which, in FIG. 1, is indicated in a dotted line. The combining means 102 is divided into an intermediate processing stage 102a and a final processing stage 102b. The intermediate processing stage 102a is formed to combine all the 2n sequences of numbers provided by means 100 with one another to obtain an intermediate processing sequence on an intermediate processing sequence line 104. The final processing stage 102b in turn is formed to combine the intermediate processing sequence on the line 104 with a number of k sequences of numbers, that is a subgroup having k sequences of numbers of the original 2n sequences of numbers. Preferably, the final processing stage 102b is formed to combine not only a first (upper) subgroup of k sequences of numbers 106a, but also a second (lower) subgroup of k sequences of numbers 106b with the intermediate processing sequence on the line 104 to obtain, at an output 108 of the final processing stage which, at the same time, is the output of the pseudorandom number generator, an output sequence representing the pseudorandom sequence of numbers over the time.

Regarding the output sequence at the output 108, either the individual bit can be considered as pseudorandom numbers which either take the value 0 or the value 1. Alternatively, the output sequence can also be regarded as a pseudorandom sequence of numbers in which a pseudorandom number has a certain number of bits, such as, for example, a 32-bit random number, a 64-bit random number. If the pseudorandom number generator shown in FIG. 1 is inventively employed in a device for ciphering and deciphering, respectively, which operates as a stream cipher, the output sequence will be combined, segment per segment, that is, for example, bit by bit, with a plain text/secret text message in binary representation, wherein an XOR or XNOR operation is usually employed for this.

The inventive pseudorandom number generator, as is illustrated in FIG. 1, can, however, also be employed in all the other fields of application for pseudorandom number generators, such as, for example, for statistical simulations, etc.

Subsequently, an inventive pseudorandom number generator according to a preferred embodiment will be explained referring to FIG. 2. It again comprises means 100 for providing 2n sequences of numbers and intermediate processing means 102a and final processing means 102b. The means 100 for providing 2n sequences of numbers preferably includes a number of 2n elemental shift registers having a number of memory cells, wherein the number of memory cells, apart from the corresponding elemental shift register, such as, for example, 100a, 100b, 100c and 100d, is referred to as R, S, T and U, respectively. The individual elemental shift registers 100a-100d which preferably all have a non-linear feedback feature, are coupled to initializing means 110 which is formed to provide a "seed" to place the individual elemental shift registers 100a-100d in a defined initial state in order for them to produce a reproducible defined pseudorandom sequence of numbers departing from this initial state. It is also to be mentioned that all the non-linear shift registers 100a-100d can be initialized to the same value or to different values. Typically, the elemental shift registers will, however, have different numbers of memory cells so that they will typically be initialized to different values.

In a certain sense, FIG. 2 shows a minimal version since means 100 includes only four elemental shift registers 100a-100d such that the parameter n equals 2. Due to the definition of the parameter k which indicates the number of sequences of numbers which cannot only be provided to the intermediate processing stage but also the final processing stage, this parameter, in the embodiment shown in FIG. 2, can only take the value "1" such that the upper subgroup of k sequences of numbers which, in FIG. 2, is referred to by 106a, only includes a single sequence of numbers and such that the lower subgroup of sequences of numbers which, in FIG. 2, is referred to by 106b, also includes a single sequence of numbers only which is provided by the means 100.

In the preferred embodiment of the present invention shown in FIG. 2, the intermediate processing means is formed to include a first initial adder 120a and a second initial adder 120b to obtain at first a first sub-processing result at an upper adder output line 122a and a corresponding second sub-processing result at a lower adder output line 122b. The signals on the lines 122a and 122b are finally multiplied with one another in a multiplexer 124 to output the intermediate processing sequence on the line 104. The intermediate processing sequence is then fed to the final processing stage 102b which in a preferred embodiment of the present invention only includes a single adder 126 to add the intermediate processing sequence on the line 104 to the first subgroup 106a of k sequences of numbers and the second subgroup 106b having k sequences of numbers to obtain the output sequence.

In particular, the shift register 10a consists of R memory cells. The shift register 100b consists of S memory cells. The shift register 100c consists of T memory cells and the shift register 100d includes U memory cells. In principle, the shift registers are assembled as will be illustrated subsequently referring to FIG. 11 or FIGS. 6 and 7.

In a preferred embodiment, the shift registers are assembled such that the numbers R, S, T and U, in pairs, do not have a common divisor. In a preferred embodiment of the present invention, the following values are chosen: R=23, S=19, T=22 and U=21. Thus, an approximate value results, due to a context, which will be detailed later, for the period length of the key sequence as follows:

$$\text{period length} \approx 2^{85}.$$

For the linear complexity of the key sequence, an approximate value results which, due to a context which will be explained later, is as follows:

$$\text{linear complexity} \approx 2^{45}.$$

In another example of application, the following could apply: R=31, S=29, T=30 and U=25. In this case, the following approximate value results for the period length:

$$\text{period length} \approx 2^{115}.$$

The following value results for the linear complexity:

$$\text{linear complexity} \approx 2^{61}.$$

Subsequently, the preferred features of the pseudorandom number generator illustrated in FIG. 2 will again be illustrated clearly. In particular, preconditions are given for obtaining a maximal predictability on the one hand and a maximal periodicity on the other hand, a maximum linear complexity, the best correlation immunity and the best avalanche criterion results:

NLFSR#1 has R memory cells
NLFSR#2 has S memory cells
NLFSR#3 has T memory cells
NLFSR#4 has U memory cells The following must apply for the numbers R, S, T and U:
$\gcd(R,S)=\gcd(R,T)=\gcd(R,U)=\gcd(S,T)=\gcd(S,U)=\gcd(T,U)=1$.

$(r_i)=(r_0, r_1, r_2, \ldots)$ to be the output sequence of NLFSR#1,
$(s_i)=(s_0, s_1, s_2, \ldots)$ to be the output sequence of NLFSR#2,
$(t_i)=(t_0, t_1, t_2, \ldots)$ to be the output sequence of NLFSR#3,
$(u_i)=(u_0, u_1, u_2, \ldots)$ to be the output sequence of NLFSR#4.

It is assumed that all the shift registers have a maximal periodicity and can generate output sequences of maximal linear complexities. Consequently, the following applies:

| | | |
|---|---|---|
| $\text{Per}((r_i)) = 2^R - 1$ | and lin. compl. | $((r_i)) = 2^R - 2,$ |
| $\text{Per}((s_i)) = 2^S - 1$ | and lin. compl. | $((s_i)) = 2^S - 2,$ |
| $\text{Per}((t_i)) = 2^T - 1$ | and lin. compl. | $((t_i)) = 2^T - 2,$ |
| $\text{Per}((u_i)) = 2^U - 1$ | and lin. compl. | $((u_i)) = 2^U - 2.$ |

Features of the key sequence $(z_i)$:
maximal period length:

$$\text{Per}((z_i))=(2^R-1)(2^S-1)(2^T-1)(2^U-1)$$

high linear complexity:

$$\text{lin. compl. }((z_i))=(2^R-2)(2^T-2)+(2^R-2)(2^U-1)+(2^S-2)(2^T-2)+(2^S-2)(2^U-2)+2^R+2^U-4$$

correlation immunity:

$$P(r_i = z_i) = P(s_i = z_i) = P(t_i = z_i) = P(u_i = z_i) = \frac{1}{2}$$

FIG. 3 shows a generalized version of the pseudorandom number generator of FIG. 2. In particular, the inventively preferred symmetry can be seen in that 2n sequences of numbers are provided at first and that the first n sequences of numbers, that is the outputs of the first n shift registers $R_1, R_2, R_3, \ldots, R_n$, in principle are treated like the second (lower) n output signals of the corresponding elemental shift registers $T_1, T_2, T_3, \ldots, T_n$. The combining means having the intermediate processing stage on the one hand and the final processing stage on the other hand is again assembled like in FIG. 2. Unlike FIG. 2, the individual adders 120a, 120b and 126 have a greater number of inputs than in the first case since the number of sequences of numbers, compared to the case of FIG. 2, can now be arbitrarily great. In addition, the case in which the number k=3 (or greater) is shown in FIG. 3.

The general device in FIG. 3 thus includes 2×n maximally periodic NLFSRs. The number of memory cells of the 2n NLFSRs preferably do not have a common divisor, taken in pairs. In addition, the device includes two initial adders 120a, 120b, a multiplier 124 and a final adder 126. It is to be pointed out that addition and multiplication in the binary case both are "modulo 2", which means that the addition equals the XOR operation. Furthermore, the multiplication, in the binary case, also equals a modulo multiplication and thus corresponds to an AND operation.

The combining means is formed to feed the output sequences of the first n shift registers $R_1, R_2, R_3, \ldots, R_n$ to the first initial adder 120A and to feed the output sequences of the second n shift registers $T_1, T_2, T_3, \ldots, T_n$ to the second initial adder 120B. The output sequences of the two initial adders 120A, 120B are fed to the multiplier 124. The output sequence of the multiplier 124 will finally be fed to the final adder 126. In addition, the number k is selected to be between 1 and n−1. Next, k NLFSRs are selected from the group of the first n NLFSRs. In addition, k NLFSRs are also selected from the second group of NLFSRs. The output sequences of all the 2k shift registers selected are directly fed to the final adder 126, as can particularly be seen in FIGS. 1 to 3. Subsequently, for the case shown in FIG. 3, a number of preferred settings for the shift registers and the combining means is presented to obtain an optimal pseudorandom number generator having all the corresponding features mentioned before in an optimal manner.

$R_1, R_2, \ldots, T_1, T_2, \ldots$ are the numbers of the memory cells of the NLFSRs.

The preferred precondition of not having a common divisor is as follows:
$\gcd(R_i, R_j)=1$, $\gcd(T_i, T_j)=1$ for $i \neq j$
and $\gcd(R_i, T_j)=1$ for every $i, j \in \{1, 2, \ldots, n\}$.

The quantities of all the shift registers are numbers which, in pairs, do not have a common divisor.

All the shift registers occurring are non-linear and maximally periodic. The first shift register, for example, includes $R_1$ memory cells and produces a bit sequence having the period length of $2^{R_1}-1$.

For the number k, $1 \leq k \leq n-1$ applies.

The output sequence $(Z_i)$, $i=1, 2, 3, \ldots$, of the entire device has the following characteristics:

1. $(Z_i)$ has a correlation immunity with regard to the output sequence of each individual shift register
2. $(Z_i)$ meets the strict avalanche criterion
3. The period length of $(Z_i)$ is:

$$\text{period} = \prod_{i=1}^{n}(2^{R_i}-1)\prod_{i=1}^{n}(2^{T_i}-1)$$

The linear complexity L of $(Z_i)$ is:

$$L = \left(-2n + \prod_{i=1}^{n} 2^{R_i}\right)\left(-2n + \prod_{i=1}^{n} 2^{T_i}\right) + \sum_{i=1}^{k}(2^{R_i} + 2^{T_i}) - 4k$$

The pseudorandom number generators described before are particularly suitable for sequential ciphering. Preferably, the pseudorandom number generators illustrated in FIGS. 1 to 3 are formed as simple hardware devices to be used in a stream cipher. The inventive concept can, however, be implemented in software, too. The realization in hardware, however, guarantees a considerably higher encrypting rate since the individual elemental shift registers can be assembled more efficiently of memory cells, such as, for example, flip flops. Nevertheless, it may be preferred for certain applications in which throughput rate is not as high an issue to do without a hardware assembly which may be too complicated compared to a software implementation and instead to provide a software implementation. This variation should be of particular advantage where only very small numbers of pieces are expected. In the case of a software implementation, the individual sequences of numbers can either be produced by a corresponding simulation of elemental shift registers or in another way of producing soft-generated pseudorandom numbers.

Figures 4, 5:
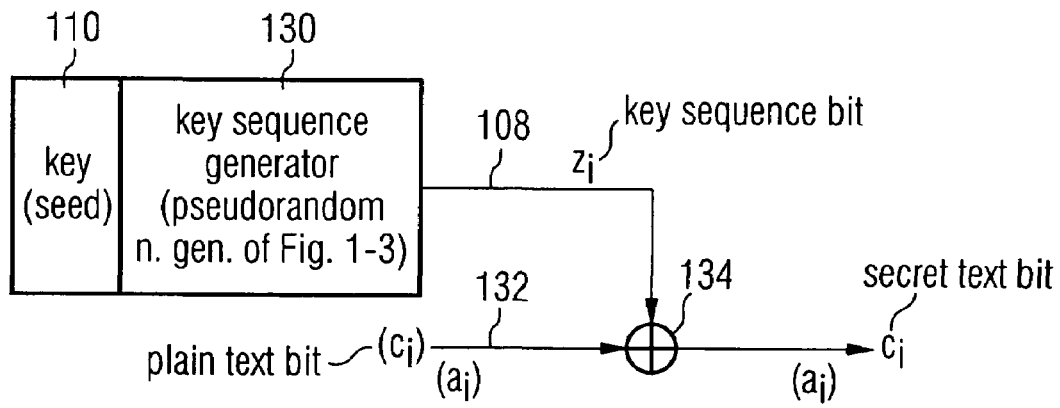
FIG. 4 shows a fundamental illustration for explaining the sequential ciphering.
FIG. 5 is a fundamental illustration of an inventive device for ciphering and deciphering, respectively.

Subsequently, the fundamental principle of sequential ciphering (deciphering) and the usage of the inventive pseudorandom number generator for sequential ciphering are detailed with reference to FIGS. 4 and 5. The essential component of a stream cipher is the key sequence generator 130 illustrated in FIG. 5, which can be initialized with the key (seed) 110. The key sequence generator 130 of FIG. 5 is set up as has been illustrated referring to FIGS. 1 to 3. The key sequence generator produces a sequence of $z_i$ key sequence bits at the key sequence generator output 108. In addition, means 132 for providing a sequence of plain text bits, which are linked by linking unit 134 with the key sequence bits is formed. As is illustrated in FIG. 4, the linkage between plain text and key takes place by means of an addition modulo 2, that is a segment-per-segment addition modulo 2. This operation corresponds to an XOR operation. The XNOR operation can also be employed with the same advantage as in the XOR operation. Both operations have the characteristic that a double cascading execution of the same operation returns the original result, such that, as is particularly illustrated with reference to FIG. 5, plain text a can be substituted by secret text c and vice versa. The key sequence generator 130 then produces a long pseudorandom bit sequence in dependence on a relatively short bit sequence, that is the cryptographic key with which the individual elemental shift registers are initialized. Sender and receiver have identical designs of the key sequence generator and use the same cryptographic key. They are thus able to generate identical key sequences.

The sender uses this key sequence for encrypting its message. Here, the message is regarded as a bit sequence or translated in a bit sequence. This is referred to as a plain text sequence. The key sequence and the plain text sequence are then added modulo 2 bit per bit. The result is the secret text sequence (cipher text sequence). The receiver in the same way links the secret text sequence received with the key sequence and again obtains the plain text sequence. The inventive key sequence generator 130, in particular in its hardware design according to FIGS. 1 to 3, is able to operate as the key sequence generator 130 for a stream cipher since a long key sequence can be produced at high speed with low hardware costs, the key sequence additionally fulfilling the "secret requirements" for a high correlation immunity and a strict avalanche criterion.

Subsequently, referring to FIGS. 6 to 10, a number of different embodiments for embodying the individual elemental shift registers 101-111 in FIGS. 6 to 9 will be given. It is also pointed out that not all the shift registers, such as, for example, in FIG. 5 the shift registers 101-111, must have the same setup but may have different setups as long as at least one and preferably all of the shift registers has/have a non-linear feedback feature.

Figure 6:
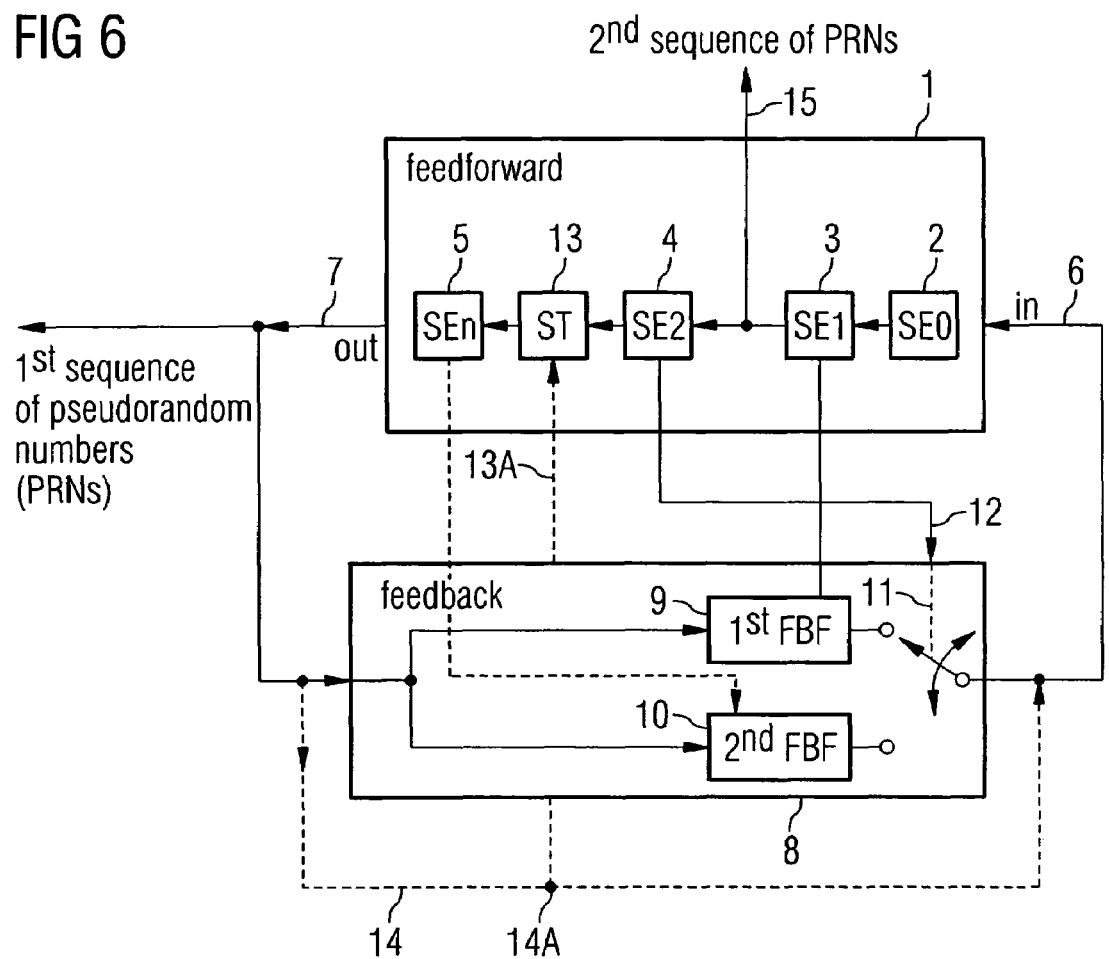
FIG. 6 shows a preferred setup of an elemental shift register having non-linear feedback.

FIG. 6 shows an elemental shift register having non-linear feedback for generating a pseudorandom sequence of numbers with feedforward means 1 comprising a sequence of memory cells 2 to 5 and additionally including input 6 and output 7 which corresponds to the output of the device for outputting the sequence of pseudorandom numbers. It is to be pointed out that the sequence of pseudorandom numbers can be supplemented by further means not shown in FIG. 6 to buffer sequences of random numbers, to combine them in another way, etc.

The device shown in FIG. 6 further includes feedback means 8 having a variable feedback feature and coupled between the input 6 and the output 7 of feedforward means 1. The variable feedback feature of the feedback means 8 is illustrated in FIG. 6 in that the feedback means 8 can take a first feedback feature 9 or a second feedback feature 10, wherein switching between the first feedback feature 9 and the second feedback feature 10 can, for example, take place by means of switching means 11. The control signal for the switching means 11 is only exemplarily provided by the fourth memory means SE2, as is symbolically illustrated by a signal path. The first feedback feature 9 and the second feedback feature 10 differ in the embodiment shown in FIG. 6 in that in the case of the first feedback feature the state of the memory means 1 (No. 3) enters into feedback while in the case of the second feedback feature the state of the memory means 5 (SEn) contributes to feedback.

Alternatively or additionally, the feedback means 8 can be formed such that in the feedback feature combining the value at the output 7 of the feedforward means with an inner state of the feedforward means, a different combining rule is used depending on the feedback features selected. In this way, an AND combination could be used for example in the first feedback feature for combining the value at the output 7 and the value of the register cell 3, while the second feedback feature differs from the first feedback feature in that it is not an AND but an OR combination that is used for combining the two values mentioned. It is obvious for those skilled in the art that different types of different combination rules can be employed.

In addition, values of the memory means SE1 and SEn, respectively, need not be fed directly to combining means in the feedback means, but these values can, for example, be inverted, combined with one another or processed non-linearly in any way before the processed values are fed to combining means.

In addition, it is not essential for the switching means 11 to be controlled directly by the state of the memory cell SE2. Instead, the state of the memory means SE2 could be inverted, processed logically or arithmetically in any other way or even combined with the state of one or several further memory means as long as a device for generating a pseudorandom sequence of numbers having a feedback means is obtained the feedback feature of which is not static but can varied dynamically depending on the feedforward means and, in particular, on one or several states in memory cells of the feedforward means.

In the feedforward means 1 of FIG. 6, additionally control means 13 arranged between two memory cells, namely in the example shown in FIG. 6 between the memory cells 4 and 5, is incorporated. Since there is a signal flow from the memory cell 0 to the memory cell n in FIG. 6, the memory cell 4 is the memory cell arranged in front of the control means as far as the signal flow is concerned, while the memory cell 5 is the signal arranged after the control means as far as the signal flow is concerned. The control means 13 has a control input 13a which can be provided with a control signal which, in principle, can be any control signal.

The control signal can, for example, be a true random number sequence so that the output sequence of the shift register arrangement is a random number sequence. The control signal can also be a deterministic control signal so that a pseudorandom number sequence is obtained on the output side.

The control input 13a, however, is preferably connected to the feedback means 8, as is illustrated in FIG. 6 by the corresponding broken line, such that a signal in the feedback means provides the control signal for the control means 13 which means that the control signal is a deterministic signal, too.

Even though the feedback means 8 in the embodiment shown in FIG. 6 is designated to be a variable feedback means, the feedback means can also be feedback means having a constant feedback feature, as is represented by a broken line 14. In this case, the control signal for the control input 13a would be derived from a branching point 14a, as is schematically illustrated in FIG. 6 by the broken line from point 14a to the control input 13a of the control means 13.

In addition, the elemental number sequence generator shown in FIG. 6, to increase efficiency, is used to produce, for example, not only a sequence at the output 7 but also a second sequence of preferably pseudorandom numbers at another input 15, wherein both sequences or only one sequence of the two sequences are/is fed into combining means. Incorporating the control means 13 has the effect that the sequence output at the output 7 is really different from the sequence output at the output 15, wherein the two sequences are not shifted towards another but, as has been explained, are really different since they are "extracted" before and after the control means 13, respectively, as far as the signal flow is concerned.

Figure 7:
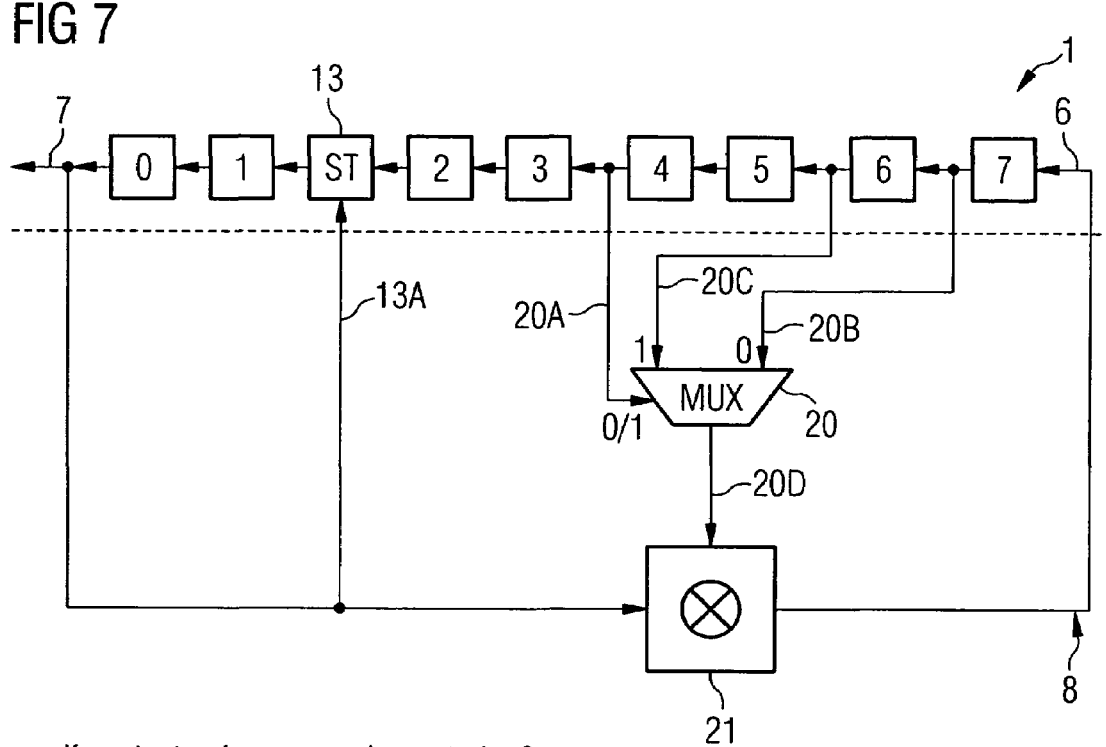
FIG. 7 shows an alternative setup for an elemental shift register having non-linear feedback.

FIG. 7 shows an 8-bit shift register, wherein a multiplexer 20 is controlled via a control input 20a depending on the state of the memory means no. 4. If the control input 20a is in a zero state, i.e. if there is a zero state in the memory cell no. 4, the multiplexer will be controlled such that it connects the state of the memory means no. 7 at a first input line 20b of it to an output line 20d. This would correspond to the effect of a linear shift register having the following feedback polynomial:

$$x^8 + x^7 + 1$$

If the control input 20a is, however, in a one state, the state of the memory means no. 6 will be connected to the output line 20d of the multiplexer 20 at a second input 20c. The output line 20d is connected to combining means 21 which, in the embodiment shown in FIG. 7, is also fed the value at the output 7 of the feedforward means, which at the same forms the output of the device for generating a pseudorandom sequence of numbers. The result calculated by combining means 21 in turn is fed to the first memory means no. 7 in FIG. 7.

If the content of the memory cell no. 4 equals 1, there will be the following feedback polynomial:

$$x^8+x^6+1$$

It becomes evident from the above description that switching between the two mentioned feedback polynomials takes place depending on the contents of the memory cell no. 4 of the feedforward means 1.

It has been found that the linear complexities of sequences obtained according to the invention are high, namely between 234 and 254 when the shift register has 8 flip-flops. It is to be pointed out that the period length of a sequence produced by any 8-step shift register can, as a maximum, be 255. The maximal value for the linear complexity of such a sequence is 254.

The most simple of all 8-step elemental shift registers which can produce a sequence is the shift register illustrated in FIG. 7 having the two feedback polynomials illustrated in FIG. 7. Regarding the theory of the linear shift registers as a comparative example, it is to be pointed out that there are 16 degree 8 primitive polynomials. Each such polynomial describes a linear shift register which can produce a sequence of the period length 255 and the linear complexity 8. In contrast, there are many more shift registers—namely 2020—according to the present invention which can produce the sequences of the period length 255 according to the present invention.

In addition, the sequences which are produced by the inventive shift registers have much greater linear complexities than their analog embodiments according to the prior art. As has been explained, the embodiment shown in FIG. 7 is preferred among all the possibilities examined for an 8-bit shift register having feedback means since it entails the lowest hardware costs, at the same time has a maximal period duration and additionally comprises a maximal linear complexity.

Control means 13 is further arranged between two memory cells in FIG. 7, wherein these are memory cells 1 and 2. The control means 13 is provided with a control signal which is extracted from the feedback means 8 having a variable feedback feature. Of course, the signal for the control means can also be "extracted" after the XOR gate 21 as far as the signal flow is concerned. In addition, the control means 13 can, of course, also be formed between any two other memory cells, such as, for example, between the memory cells 5 and 6 or between the memory cells 0 and 7, i.e. either, in the signal flow direction, after the memory cell 0 so that the signal at the output of the memory means is directly output at the output 7 or directly before the memory cell 7.

It is, however, preferred for reasons of signal processing for all the signals, such as, for example, output sequences, control signals and data signals for the multiplexer, etc., to be extracted at the output of shift registers so that the shift register, apart from its functionality for producing the number sequence, also serves to provide stable signals for logic gates. Thus, corresponding output stages for logic gates need not be produced when control signals or output signals are extracted from the outputs of the logic gates themselves.

Figure 8:
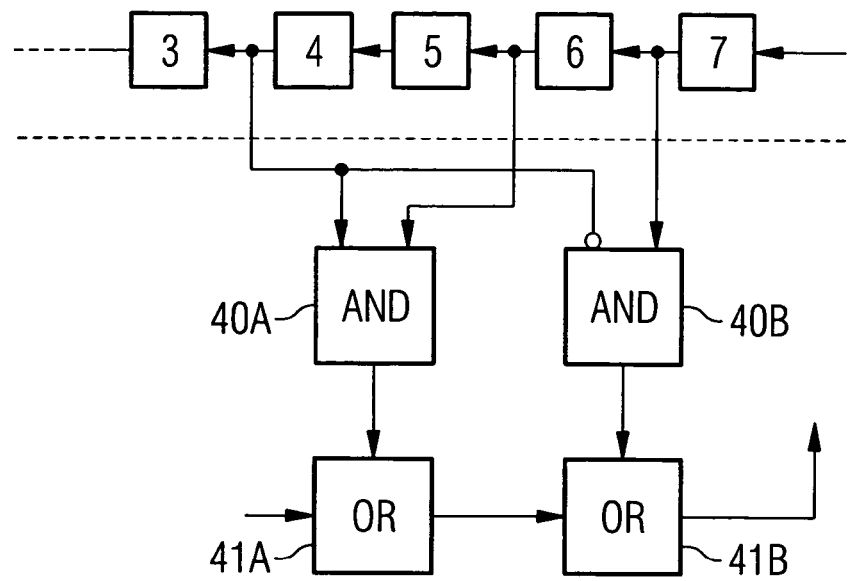
FIG. 8 shows an alternative setup for an elemental shift register having non-linear feedback.

Subsequently, reference will be made to FIG. 8 to illustrate a special implementation of the multiplexer means 20 of FIG. 7. The multiplexer 20 can easily be implemented by two AND gates 40a, 40b which are both connected to OR gates (or XOR gates) 41a, 41b coupled in series, as is shown in FIG. 8. In particular, the state of the memory cell 4 is fed to the first AND gate 40a, while the inverted state of the memory cell 4 is fed to the second AND gate 40b. For determining the corresponding feedback polynomial, the contents of the memory cell 6 is fed to the first AND gate 40a as a second input, while the contents of the memory cell 7 is fed to the second AND gate 40b and a second input. Additionally, it is to be pointed out that the two OR gates 41a, 41b connected in series could be implemented in an alternative way. When, however, implementations are required in which each logic gate has two inputs and an output, the illustration exemplarily shown in FIG. 8 will be of advantage.

In a method for generating a pseudorandom sequence of numbers from an elemental shift register using a feedforward means 1 having a plurality of memory means having an input and an output for outputting the sequence of numbers, and feedback means comprising a variable feedback feature and connected between the input and the output, a step of initializing the memory means in the feedforward means to a predetermined initial value will be performed at first.

Responsive to the state of a memory means of the plurality of memory means of the feedforward means, the control means will then be controlled in another step depending on the feedback signal. Subsequently, the state of a memory means connected to the output of feedforward means 1 is output to obtain a number of the sequence of random numbers. After this, a decision block is performed to examine whether further random numbers are required. If this question is answered with a no, the process ends here. If it is, however, determined that further numbers are required, the decision block will be answered with a "yes", whereupon another step follows in which the plurality of memory means are reoccupied based on a previous state of the memory means and on an output of the feedback means. The steps of controlling the control means, outputting and reoccupying are repeated as often as desired in a loop to finally obtain a pseudorandom sequence of numbers.

It is to be pointed out that this method can be performed using a regular clock or even using an irregular clock even though the version having the regular clock is preferred as far as an improved safety against power or time attacks is concerned.

In the case of the linear shift register illustrated in FIG. 7, it is pointed out that reoccupying the plurality of memory means takes place in a series, based on the previous state of the memory means which—taken as a whole—is shifted by one step to the left so that one state of the memory means 0 "drops out" on the output side. This "dropped out" value is the number which will be output. The memory means number 7 in FIG. 7 to the very right can be reoccupied by left shifting the entire state of all the memory means considered. The plurality of memory means and, in particular, memory means 7 are thus reoccupied depending on an output of the feedback means at the actual clock point in time.

Figure 9:
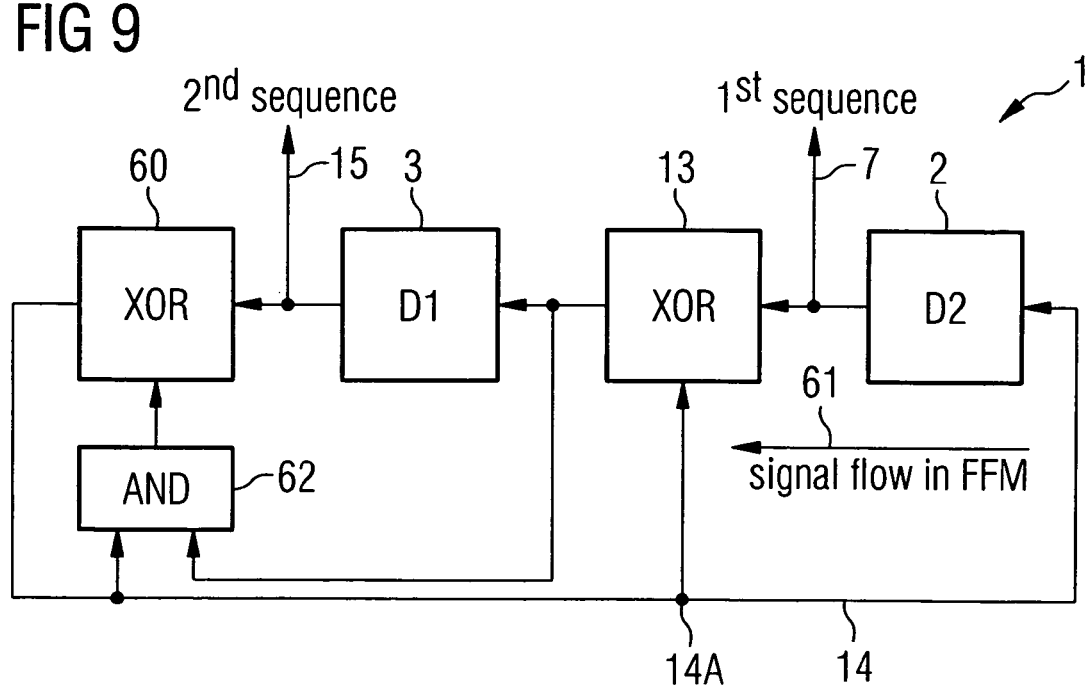
FIG. 9 shows an alternative setup for an elemental shift register having a non-linear feedback feature.

FIG. 9 shows an alternative embodiment in which the alternative of the feedback means referred to by the reference numeral 14 in FIG. 6 is illustrated. In particular, the feedback means 14 in FIG. 9 is formed such that it does not have a variable feedback feature but has a constant feedback feature. The inventive advantages are obtained by arranging at least one control means 13 and preferably another control means 60 in the feedforward means.

In the embodiment shown in FIG. 9, the control means 13 is controlled with a control signal which is directly derived from the feedback means 14. In the feedforward means shown in FIG. 9, only two memory means 2 and 3 are provided, wherein the first control means 13 is connected between the memory cells 2 and 3, while the second control means 60 is connected between the memory cell 3 and the memory cell 2 (via the feedback means 14). In addition, a signal flow is marked by an error 61 in FIG. 9, which represents the signal flow in the feedforward means which in the embodiment shown in FIG. 9 is from the right to the left hand side. A bit at first reaches the memory means D2. The bit stored in D2 is output and forms a bit of the first sequence. At the same time, the bit output by the memory means 2 is XOR-ed in the embodiment shown in FIG. 9 with the bit just applying at the feedback means 14 to obtain a result bit which will then be clocked into the memory cell 3 in the next cycle at an output of the XOR operation. Thus the bit just present in the memory cell 3 will be clocked out of the memory cell 3 and thus represents a bit of the second pseudorandom sequence of numbers. The bit at the output of the memory cell 3 is then XOR-ed with a control signal for the second control means 60, wherein the control signal is produced from the signal on the feedback means 14 and the output signal of the first control means 13 by means of combining means. The combining means 62 preferably is a logic gate and, in particular in the embodiment shown in FIG. 9, an AND gate. The first sequence is output via an output 7, while the second sequence is output via an output 15. The two sequences output via the outputs 7 and 15 are really different and not only phase-shifted with regard to each other.

In order to simplify the implementation of the XOR gate 60, another memory cell is provided in another preferred embodiment after the XOR gate 60 in the signal flow direction, wherein at the output of this memory cell a sequence which is only phase shifted to the first sequence at the output 7 which is, however, different in principle to the second sequence at the output 15 will be output.

Figure 10:
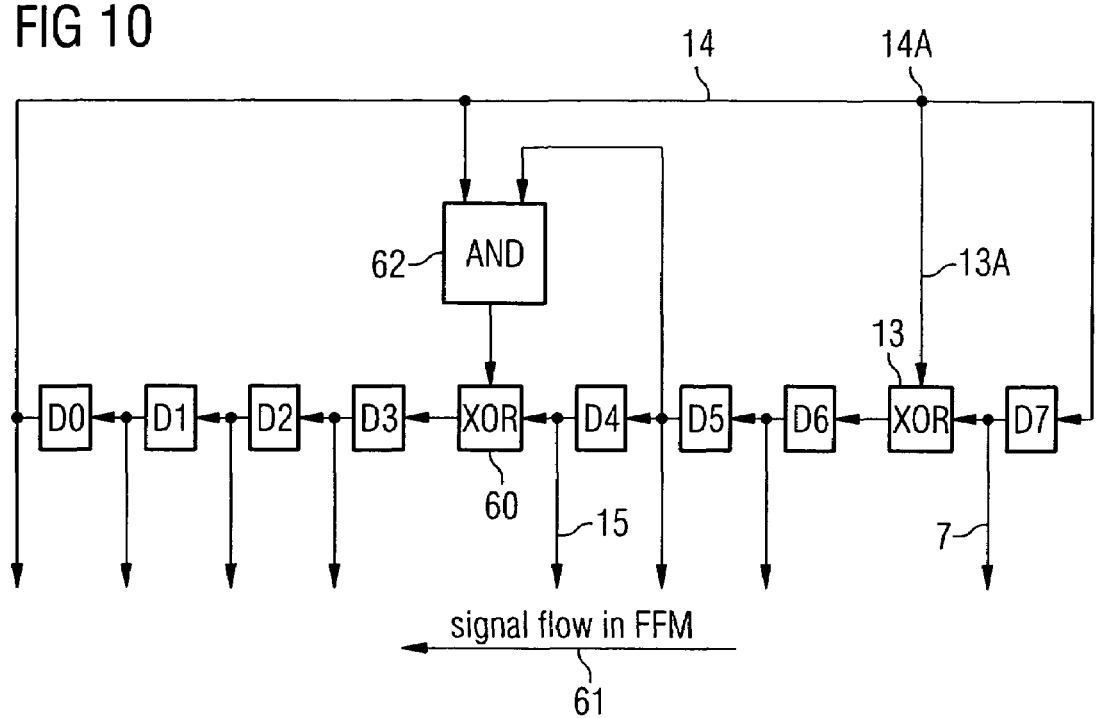
FIG. 10 shows an exemplary setup for an elemental shift register having non-linear feedback.

FIG. 10 shows an 8-bit elemental shift register with flip-flops D0-D7 which are connected in series, wherein additionally the second control means 60 is provided between the fourth and third flip-flops, while the first control means 13 is provided between the seventh and sixth flip-flops. The first control means 13 is again fed directly with the feedback signal on the feedback means 14, while the second control means 60 is provided with the output signal of the AND gate 62 which in turn is fed on the one hand by the feedback means 14 and on the other hand by the output signal of the fifth cell D5. In analogy to the embodiment shown in FIG. 9, the output sequence of the fourth cell D4 represents the second pseudorandom number sequence, while the output sequence of the seventh cell D7 represents the first random number sequence.

The embodiments shown in FIGS. 9 and 10 for an elemental shift register differ in that two further register cells D5, D6 are connected between the two control means and that further memory cells D0 to D3 are formed at the output of the XOR control means 60 so that an 8-bit shift register is formed. In an embodiment, a pseudorandom number sequence is extracted at the output of each memory cell D0-D7 and fed to combining means to obtain a particularly efficient pseudorandom number generator. In particular, the two sequences output by the cells D4 and D5 are shifted versions of the sequence output by the cell D6. In addition, the four sequences output by the cells D2, D1, D0 and D7 are shifted versions of the sequence output by the cell D3. Thus, each sequence of the cells D7, D0, D1, D2, D3 is essentially different to a sequence of the cells D4, D5, D6.

It is to be pointed out that the initial state which the shift register is initialized to, that is so-called seed explained referring to FIG. 7, element 55, is to be designed such that it at least includes a value for a memory cell which is unequal to zero in order for the shift register to somehow "start up" and not to output eight zero sequences at the eight outputs. Subsequently, when this condition is fulfilled, all the eight sequences have a maximum periodicity, that is have a period length of 255. In addition, each of the eight sequences output in the embodiment shown in FIG. 10 has a maximal linear complexity of 254. Furthermore, as has already been explained, the two sequences output by the cells D3 and D6 are essentially different.

As can also be seen from FIG. 10, memory cell D5 here is the control cell. If the cell D5 contains a 0, the effect of the control means 60 between the cells D3 and D4 will be suppressed. Only the XOR between the cells D6 and D7 will then be applied. If the cell D5, however, includes a 1, both XOR means 13 and 60 will be used.

Figure 11:
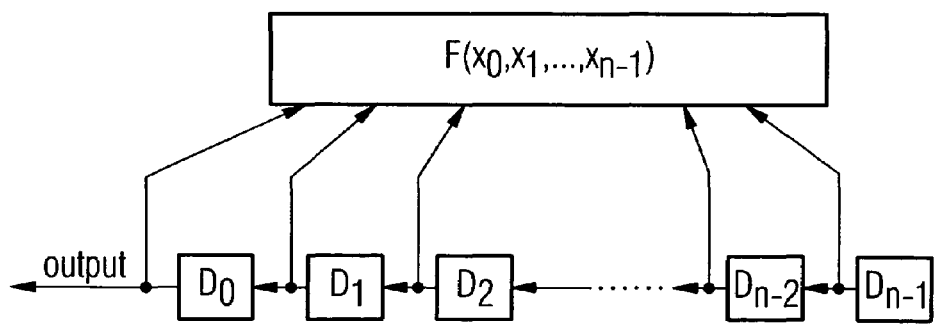
FIG. 11 is a general illustration of an elemental shift register with memory cells in the feedforward means and feedback function F.

FIG. 11 shows a general feedback shift register having memory cells $D_0, \ldots, D_{n-1}$ with feedforward means and feedback means which is referred to by $F(x_0, x_1, \ldots, x_{n-1})$.

A general n-step (or n-cell) feedback shift register over the base element $GF(2)=\{0,1\}$ is assumed here. The shift register includes n memory cells (flip-flops) $D_0, D_1, \ldots, D_{n-1}$ and the (electronical) realization of a feedback function $F(x_0, x_1, \ldots, x_{n-1})$. The feedback function associates an unambiguous value from $GF(2)$, that is the value 0 or 1, to each n tuple including n bits. In mathematical terminology, F is a function with a definition domain of $GF(2)^n$ and a target domain of $GF(2)$.

The shift register is controlled by an external clock. The contents of the memory cell $D_j$ is shifted to the left neighboring cell $D_{j-1}$ with each clock, wherein $1 \leq j \leq n-1$. The contents of the memory cell $D_0$ is output. If the contents of the memory cells $D_0, D_1, \ldots, D_{n-2}, D_{n-1}$, at a time t, are given by $$s_t, s_{t+1}, \ldots, s_{t+n-2}, s_{t+n-1},$$

the memory cells, one clock later, that is at a time t+1, will contain the bits $$s_{t+1}, s_{t+2}, \ldots, s_{t+n-1}, s_{t+n},$$

wherein the value $s_{t+n}$ entering the cell $D_{n-1}$ is given by $$s_{t+n} = F(s_t, s_{t+1}, s_{t+n-1}).$$

Figure 12:
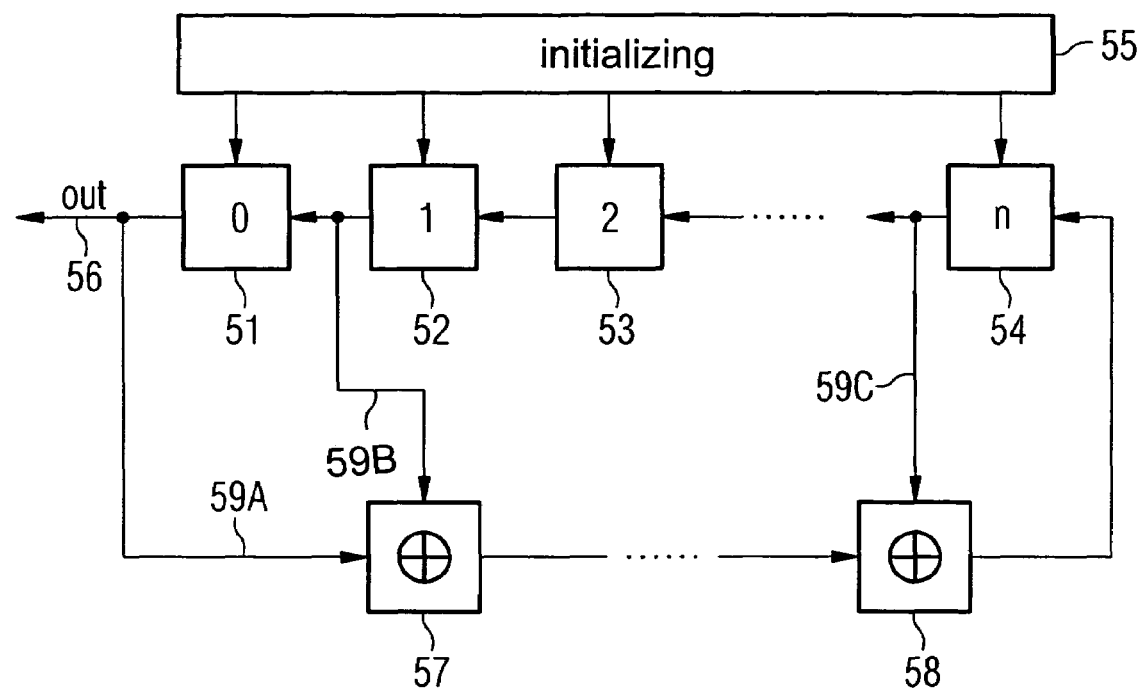
FIG. 12 shows a well-known linear shift register for producing a random number sequence.

The n tuple $(s_t, s_{t+1}, \ldots, s_{t+n-1})$ describes the state of the shift register at a time t. The n tuple $(s_0, s_1, \ldots, s_{n-1})$ is called the initial state. FSR(F) is used as an abbreviation for the general feedback shift register having a feedback function F (FSR stands for feedback shift register). FIG. 12 shows a general feedback shift register.

The shift register outputs one bit with each clock of the external clock. In this way, the shift register can produce a periodic bit sequence $s_0, s_1, s_2, \ldots$, a so-called shift register sequence. $s_0, s_1, \ldots, s_{n-1}$ are to be taken as initial values of the shift register sequence. The feedback function $F(x_0, x_1, \ldots, x_{n-1})$ and the initial values $s_0, s_1, \ldots, s_{n-1}$ completely determine the shift register sequence. Since there are only $2^n$ different states for the shift register, the period length of the shift register sequence $s_0, s_1, s_2, \ldots$ is at most $2^n$.

A general feedback shift register FSR(F) will be called homogenous if its feedback function F is homogenous, i.e. if $F(0, 0, \ldots, 0)=0$. A homogenous shift register put in the initial state $s_0 = s_1 = \ldots = s_{n-1} = 0$ will produce the zero sequence. It follows that the period length of the output sequence of an n-step homogenous shift register can at most be $2^n - 1$. When the period length has the maximum value of $2^n - 1$, the shift register sequence is called an M sequence and the shift register is at a maximum. It is an important task to find maximum shift registers.

Two special cases of the general feedback shift register FSR(F) are of particular interest. In one case, the feedback function F has the form:

$$F(x_0, x_1, \ldots, x_{n-1}) = \sum_{0 \leq i \leq j \leq n-1} a_{ij} x_i x_j$$

wherein the coefficients $a_{ij}$ are either 0 or 1. In this case, this is called a squared feedback function as an example for a non-linear feedback function and the expression squares is also transferred to the shift register.

The other special case is when the feedback function F is linear. In this case, F has the following form:

$$F(x_0, x_1, \ldots, x_{n-1}) = a_0 x_0 + a_1 x_1 + \ldots + a_{n-1} x_{n-1},$$

wherein the coefficients $a_i$ occurring are again 0 or 1, that is elements of GF(2). In this case, this is called a linear or a linear feedback shift register and the abbreviation LFSR (linear feedback shift register) is used for this. It is to be noted that both the linear feedback as well as the squared feedback shift registers are homogenous.

An n-step linear feedback shift register is usually characterized by a binary degree n polynomial f(x) in a variable x. This polynomial f is called the characteristic polynomial of the linear feedback shift register. The shift register is then indicated as LFSR(f).

The feedback function $F(x_0, x_1, \ldots, x_{n-1})$ of a linear feedback shift register is a polynomial in n variables $x_0$, $x_1, \ldots, x_{n-1}$ and of degree 1. In contrast, the characteristic polynomial f(x) of the same linear shift register is a polynomial of only one variable, namely the variable x, but of degree n. The following applies:

$$f(x) = x^n + F(1, x, x^2, \ldots, x^{n-1})$$

The nonlinearity of the feedback function can thus be performed by relatively arbitrary designs of the feedback function F. For this, it will suffice in principle to only multiply the output signals of two memory cells $D_i$ and $D_{i+1}$, wherein a squared shift register would be the result of this. Of course, more than two memory cell outputs can be multiplied by one another or be subjected to some non-linear function. In principle, a feedback with only one output signal of a single memory could, however, also be performed by for example only feeding the output signal of the memory cell $D_0$, feeding it to the function $F(x_0)$ and feeding the output signal of this function, for example, on the input side into the memory cell $D_{n-1}$. Such a non-linear function with only one value would, for example, be an inversion, i.e. a logic NOT function. The non-linear function could, however, also be any other function, such as, for example, a non-linear association function or a cryptographic function.

Depending on the circumstances, the inventive method for producing pseudorandom numbers and method of ciphering and deciphering can be implemented in either hardware or software. The implementation can take place on a digital storage medium, such as, for example, a floppy disc or a CD with control signals which can be read out electronically and which can cooperate with a programmable computer system such that the corresponding method will be executed. In general, the invention also includes a computer program product having a program code stored on a machine-readable carrier for performing the inventive method when the computer program product runs on a computer. Put differently, the invention can thus be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A pseudorandom number generator comprising:
    a unit configured to provide a number of 2n sequences of numbers, n being greater than or equal to 2; and
    a unit configured to combine the sequences of numbers to obtain an output sequence, wherein the unit for combining comprises:
        an intermediate processing stage configured to combine the 2n sequences of numbers to produce an intermediate processing sequence; and
        a final processing stage configured to combine a first subgroup of k of the sequences of numbers with the intermediate processing sequence to obtain the output sequence, k being greater than or equal to 1 and smaller than n,
    wherein the output sequence is used in an application selected from the group of applications consisting of: a cryptographic application, a coding application, a simulation application, a statistic application, a computer program testing application, a probabilistic algorithm, a numerical mathematical application, a numerical integration application, and a Monte Carlo application.

2. The pseudorandom number generator according to claim 1, wherein the final processing stage includes an adder.

3. The pseudorandom number generator according to claim 2, wherein the sequences of numbers are binary sequences and the adder is designed as an XOR gate.

4. The pseudorandom number generator according to claim 1, wherein the intermediate processing stage comprises:
    a first combiner configured to combine a first group of n sequences of numbers to obtain a first group sequence of numbers,
    a second combiner configured to combine a second group of n sequences of numbers to obtain a second group sequence of numbers, and
    a third combiner configured to combine the first group sequence of numbers and the second group sequence of numbers to obtain the intermediate processing sequence.

5. The pseudorandom number generator according to claim 4, wherein the first combiner and the second combiner execute a same combination rule, wherein this combination rule differs from a combination rule executable by the third combiner.

6. The pseudorandom number generator according to claim 4, wherein the first combiner comprises an adder, the second combiner comprises an adder, and the third combiner comprises a multiplier.

7. The pseudorandom number generator according to claim 6, wherein the sequences of numbers are binary sequences, and wherein the first combiner comprises an XOR gate, the second combiner also comprises an XOR gate, and the third combiner comprises an AND gate.

8. The pseudorandom number generator according to claim 1,
    wherein the intermediate processing stage comprises exactly one adder for adding n sequences of numbers, exactly one adder for adding n remaining sequences of numbers and exactly one multiplier for multiplying results of the first and the second adder, and wherein the final processing stage comprises exactly one adder for adding the intermediate processing sequence to the first subgroup of k sequences of numbers and a second subgroup of k different sequences of numbers.

9. The pseudorandom number generator according to claim 1, wherein the unit configured to provide comprises an individual feedback elemental shift register for each sequence of numbers.

10. The pseudorandom number generator according to claim 9, wherein at least one of the feedback elemental shift registers is a shift register having a non-linear feedback feature.

11. The pseudorandom number generator according to claim 9, wherein an elemental shift register comprises:

a plurality of memory cells connected in series, wherein the elemental shift register output is coupled to an output of a memory cell; and a feedback unit having a feedback input and a feedback output, wherein the feedback input is connected to an output of a memory cell and is formed to combine signals at outputs of at least two memory cells to one another in a non-linear manner.

12. The pseudorandom number generator according to claim 9, wherein each feedback shift register comprises a number of memory cells, wherein the numbers of memory cells of the elemental shift registers differ from one another.

13. The pseudorandom number generator according to claim 9, wherein each feedback shift register comprises a number of memory cells, and wherein the number of memory cells of the shift registers, taken in pairs, do not have a common divisor.

14. The pseudorandom number generator according to claim 9, wherein each feedback shift register comprises a number of memory cells, and wherein the elemental shift registers are designed such that a greatest common divisor between the numbers of the memory cells among all the shift registers equals 1.

15. The pseudorandom number generator according to claim 1, wherein the unit for providing is formed to produce the 2n sequences of numbers such that the 2n sequences have a maximal periodicity.

16. The pseudorandom number generator according to claim 1, wherein the unit configured to provide is formed to generate the 2n sequences of numbers such that the 2n sequences have a linear complexity which equals the maximal linear complexity or is smaller than the maximal complexity by at most a predetermined amount.

17. The pseudorandom number generator according to claim 16, wherein the predetermined amount is 75% of the maximal linear complexity.

18. The pseudorandom number generator according to claim 1, wherein the unit configured to combine is formed to include only gates which are selected from the group consisting of AND gates, NAND gates, OR gates, NOR gates, XOR gates, and XNOR gates.

19. A method of providing pseudorandom numbers, comprising:

providing a number of 2n sequences of numbers, n being greater than or equal to 2; and combining the sequences of numbers to obtain an output sequence, wherein the 2n sequences of numbers are at first combined in a first processing circuit to obtain an intermediate processing sequence, and wherein the intermediate processing sequence is then combined with a subgroup of k of the sequences of numbers in a second processing circuit to obtain the output sequence, k being greater than or equal to 1 and smaller than n, wherein the output sequence is used in an application selected from the group of applications consisting of: a cryptographic application, a coding application, a simulation application, a statistic application, a computer program testing application, a probabilistic algorithm, a numerical mathematical application, a numerical integration application, and a Monte Carlo application.

20. A computer readable memory having a computer program having a program code for performing a method of ciphering or deciphering, comprising: providing a plain text sequence to be ciphered or a secret text sequence to be deciphered; providing a pseudorandom output sequence according to the method of claim 19; and linking the plain text sequence to the output sequence or the secret text sequence to the output sequence to obtain a ciphered sequence or a deciphered sequence, respectively, when the program runs on a computer.

21. A device for ciphering or deciphering, comprising:

a unit configured to provide a plain text sequence to be ciphered or a secret text sequence to be deciphered;

a pseudorandom number generator comprising: a unit configured to provide a number of 2n sequences of numbers, n being greater than or equal to 2; a unit configured to combine the sequences of numbers to obtain an output sequence, wherein the unit configured to combine comprises: an intermediate processing stage configured to combine the 2n sequences of numbers to produce an intermediate processing sequence; and a final processing stage configured to combine a subgroup of k of the sequences of numbers with the intermediate processing sequence to obtain the output sequence, k being greater than or equal to 1 and smaller than n for providing an output sequence; and a unit configured to link the plain text sequence to the output sequence or the secret text sequence to the output sequence to obtain a ciphered sequence or a deciphered sequence, respectively.

22. The device according to claim 21, wherein the plain text sequence or the secret text sequence comprises sequence segments, wherein the output sequence comprises output segments, and wherein the unit configured to link is formed to perform linking segment per segment.

23. The device according to claim 21, wherein the pseudorandom number generator is initialized to an initial value by a seed, wherein the seed represents a ciphering secret.

24. A method of ciphering or deciphering, comprising:

providing a plain text sequence to be ciphered or a secret text sequence to be deciphered;

providing a pseudorandom output sequence according to a method of providing pseudorandom numbers, comprising the steps of: providing a number of 2n sequences of numbers, n being greater than or equal to 2; and combining the sequences of numbers to obtain an output sequence, wherein the 2n sequences of numbers are at first combined in a first processing circuit to obtain an intermediate processing sequence, and wherein the intermediate processing sequence is then combined with a subgroup of k of the sequences of numbers in a second processing circuit to obtain the output sequence, k being greater than or equal to 1 and smaller than n; and linking the plain text sequence to the output sequence or the secret text sequence to the output sequence to obtain a ciphered sequence or a deciphered sequence, respectively.

25. A computer readable memory having a computer program having a program code for performing a method of providing pseudorandom numbers, comprising: providing a number of 2n sequences of numbers, n being greater than or equal to 2; and combining the sequences of numbers to obtain an output sequence, wherein the 2n sequences of numbers are at first combined in an intermediate processing step to obtain an intermediate processing sequence, and wherein the intermediate processing sequence is then combined with a subgroup of k of the sequences of numbers in a final processing step to obtain the output sequence, k being greater than or equal to 1 and smaller than n, when the program runs on a computer, wherein the output sequence is used in an application selected from the group of applications consisting of: a cryptographic application, a coding application, a simulation application, a statistic application, a computer program testing application, a probabilistic algorithm, a numerical mathematical application, a numerical integration application, and a Monte Carlo application.

\* \* \* \* \*